(12) United States Patent
Kim et al.

(10) Patent No.: US 6,538,785 B1
(45) Date of Patent: *Mar. 25, 2003

(54) SIGNAL TRANSFER APPARATUS OF COMPUTER

(75) Inventors: Bumsoo Kim, Seoul (KR); Hyun Kuk Shin, Suwon (KR); Byeong Cheon Koh, Sungnam (KR)

(73) Assignee: Samsung Electronics Co., Ltd., Kyungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,289

(22) Filed: Dec. 7, 1998

(30) Foreign Application Priority Data

Dec. 10, 1997 (KR) ............................. 97-67427

(51) Int. Cl.⁷ ........................... H04B 10/00; H04B 10/06
(52) U.S. Cl. ........................................ 359/154; 359/193
(58) Field of Search ................................ 359/157, 173, 359/163, 188, 193, 195

(56) References Cited

U.S. PATENT DOCUMENTS

| | | | |
|---|---|---|---|
| 4,724,315 A | 2/1988 | Goerne | |
| 4,863,233 A | 9/1989 | Nienaber et al. | 350/96.2 |
| 4,883,950 A * | 11/1989 | Chiba et al. | 235/440 |
| 4,949,170 A * | 8/1990 | Yamagidaira et al. | 358/86 |
| 5,005,939 A | 4/1991 | Arvanitakis et al. | 350/96.2 |
| 5,053,882 A * | 10/1991 | Yanagidaira | 358/342 |
| 5,263,108 A | 11/1993 | Kurokawa et al. | 385/89 |
| 5,617,239 A * | 4/1997 | Walker | 359/181 |
| 5,699,177 A * | 12/1997 | Yamamoto | 359/125 |
| 5,761,234 A * | 6/1998 | Craig et al. | 372/75 |
| 5,793,506 A * | 8/1998 | Schmid | 359/125 |
| 6,031,648 A * | 2/2000 | Javitt et al. | 359/161 |
| 6,084,848 A * | 7/2000 | Goto | 369/121 |

FOREIGN PATENT DOCUMENTS

| | | | |
|---|---|---|---|
| CN | 86108247 A | 12/1986 | |
| CN | 2159639 | 3/1994 | |
| EP | 0 519 210 | 12/1992 | G02B/6/38 |
| JP | 55-101823 | 8/1980 | G01J/1/04 |
| JP | 2-154208 | 6/1990 | G02B/6/42 |
| JP | 9-237942 | 9/1997 | H01S/3/18 |

OTHER PUBLICATIONS

Japanese Abstract No. sho 58–70651, dated Apr. 27, 1983.

* cited by examiner

*Primary Examiner*—Leslie Pascal
*Assistant Examiner*—Dalzid Singh
(74) *Attorney, Agent, or Firm*—Sughrue Mion, PLLC

(57) ABSTRACT

A signal transfer apparatus of a computer. The signal transfer apparatus includes a substrate installed in a main system frame of the computer, a driving device installed on the substrate, for converting a video signal into a current signal, a semiconductor laser array for emitting light corresponding to the current signal from the driving device, an optical fiber bundle for transferring the light emitted from the semiconductor laser array to a display, a photo receiver array for converting the light transferred through the optical fiber bundle into a current signal, and a converter for converting the current signal output from the photo receiver array into a video signal.

17 Claims, 6 Drawing Sheets

SIGNAL TRANSFER APPARATUS OF COMPUTER

BACKGROUND OF THE INVENTION

1. Field of the Invention

The present invention relates to a signal transfer apparatus of a computer, and more particularly, to a signal transfer apparatus capable of transferring information at a high transfer rate to a display from a main system frame in which a computer system is installed.

2. Description of the Related Art

A conventional laptop computer shown in FIG. 1 comprises a main system frame 10 in which a computer system is installed, a display 11 for displaying various information from the main system frame 10, and a keyboard 12 for inputting various information and commands.

The display 11 may be a liquid crystal display device (LCD) or a plasma display panel (PDP). In recent years, a need for large and high-resolution displays has increased. Also, the amount of data transferred to the display 11 from the main system frame 10, and the data transfer rate have increased.

In the conventional computer, a cable 15 made of metal wire as shown in FIG. 2 is used to transfer an information signal from the main system frame 10 to the display 11. The information signal, i.e., a transistor transistor logic (TTL) signal, is transferred from the main system frame 10 to the display 11 through the cable 15, and the display 11 displays the received information or images according to the transferred signal.

As another conventional method, low-voltage differential signaling (LVDL) is used as shown in FIG. 3. In detail, the TTL signal output from the main system frame 10, i.e., a parallel pixel data, is converted into low-power serial data by a LVDS transmitter 20, and then transferred through the cable 25. The transmitted serial data is converted into a parallel TTL signal by a LVDS receiver 27 situated in the display 11. The display 11 then displays an image according to the TTL signal.

Such signal transfer between the main system frame 10 and the display 11 of the conventional computer is achieved through the metal cable 15 or 25 whose transfer characteristics depend on a R-C time constant. However, the signal transfer rate is limited because the R-C time constant has a critical value. Thus, the metal wire cable 15 or 25 cannot satisfy the requirements for an increase in both the amount of data transferred and the transfer rate. Also, when an information signal is transferred through a metal wire, it is very likely that electromagnetic interference (EMI) will occur.

When the LVDS is adopted, it is not possible to achieve a long-distance transfer, such as a transfer of an information signal to an extra external display, because the LVDS is driven at a comparatively low voltage, e.g., approximately 350 mV.

SUMMARY OF THE INVENTION

To solve the above problems, it is an object of the present invention to provide a signal transfer apparatus of a computer, capable of transferring a signal at a high rate between a main system frame and a display without electromagnetic interference, and capable of achieving a long-distance signal transfer between the main system frame and an external display.

According to an aspect of the present invention, there is provided a signal transfer apparatus of a computer, comprising: a substrate installed in a main system frame of the computer; a driving device installed on the substrate, for converting a video signal into a current signal; a semiconductor laser array for emitting light corresponding to the current signal from the driving device; an optical fiber bundle for transferring the light emitted from the semiconductor laser array to a display; a photo receiver array for converting the light transferred through the optical fiber bundle into a current signal; and a converter for converting the current signal output from the photo receiver array into a video signal.

According to another aspect of the present invention, there is provided a signal transfer apparatus of a computer, comprising: a substrate installed in a main system frame of the computer; a driving device installed on the substrate, for converting a video signal into a current signal; a semiconductor laser array for emitting light corresponding to the current signal from the driving device; a beam splitter for splitting the light emitted from the semiconductor laser array; a first transfer portion including a first optical fiber bundle for transferring a part of the light split by the beam splitter to a first display, a first photo receiver array for converting the light transferred through the first optical fiber bundle into a current signal, and a first converter for converting the current signal output from the first photo receiver array into a video signal; and a second transfer portion including a second optical fiber bundle for transferring another part of the light split by the beam splitter to a second display, a second photo receiver array for converting the light transferred through the second optical fiber bundle into a current signal, and a second converter for converting the current signal output from the second photo receiver array into a video signal.

According to still another aspect of the present invention, there is provided a signal transfer apparatus of a computer, comprising: a substrate installed in a main system frame of the computer; a driving device installed on the substrate, for converting a video signal into a current signal; first and second semiconductor laser arrays for each emitting light corresponding to the current signal of the driving device; a first transfer portion including a first optical fiber bundle for transferring the light emitted from the first semiconductor laser array to a first display, a first photo receiver array for converting the light transferred through the first optical fiber bundle into a current signal, and a first converter for converting the current signal output from the first photo receiver array into a video signal; and a second transfer portion including a second optical fiber bundle for transferring the light emitted from the second semiconductor laser array to a second display, a second photo receiver array for converting the light transferred through the second optical fiber bundle into a current signal, and a second converter for converting the current signal output from the second photo receiver array into a video signal.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
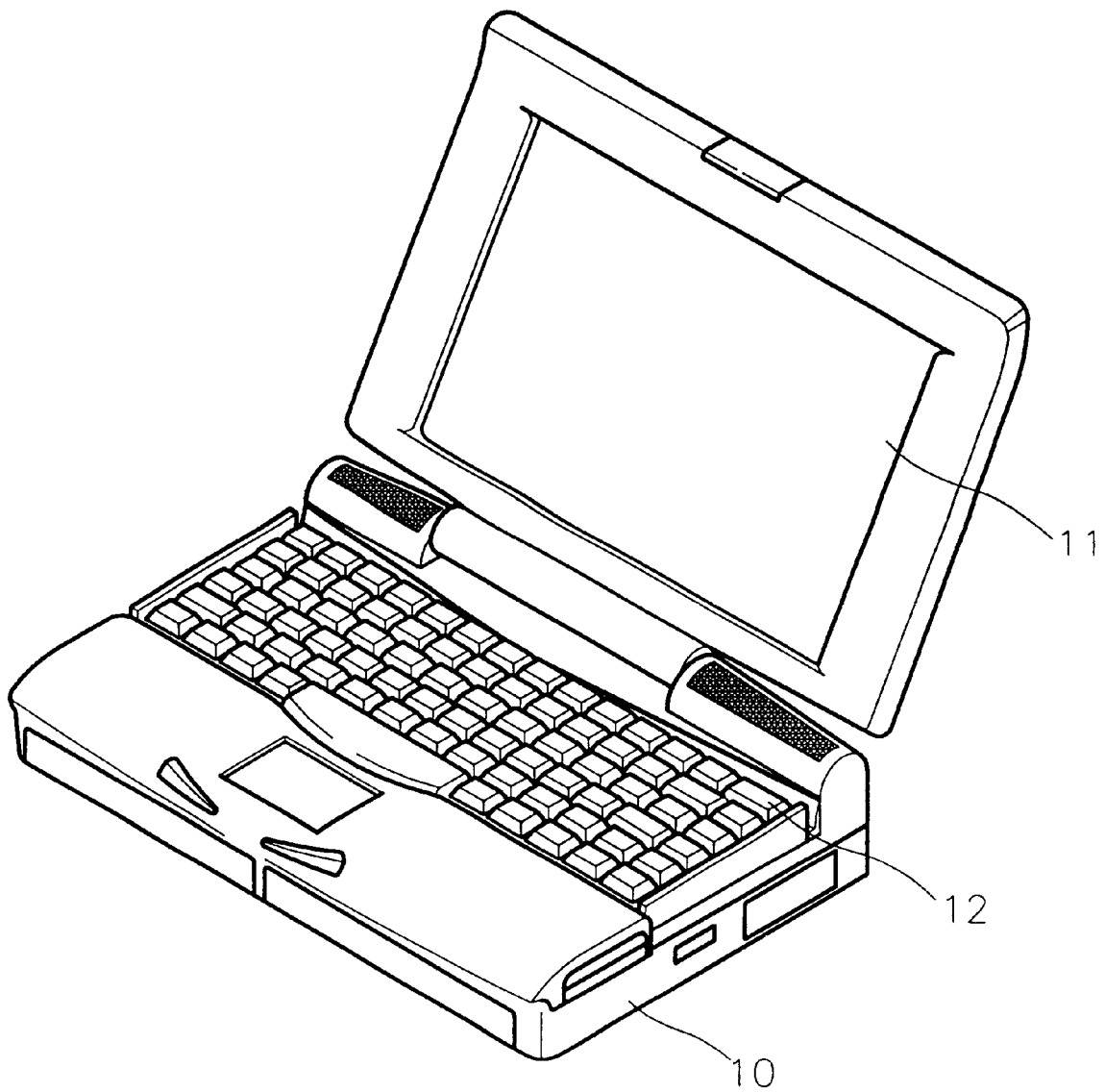
FIG. 1 is a perspective view showing the appearance of a conventional laptop computer.
Figure 2:
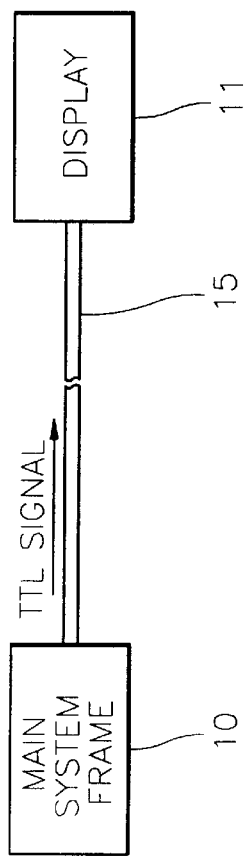
FIG. 2 is a diagram showing an example of a conventional signal transfer apparatus in a computer.
Figure 3:
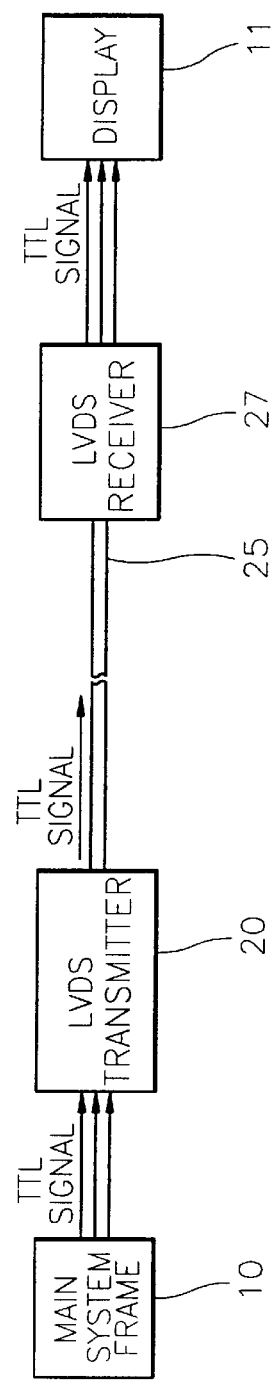
FIG. 3 is a diagram showing another example of a conventional signal transfer apparatus in a computer.
Figure 4:
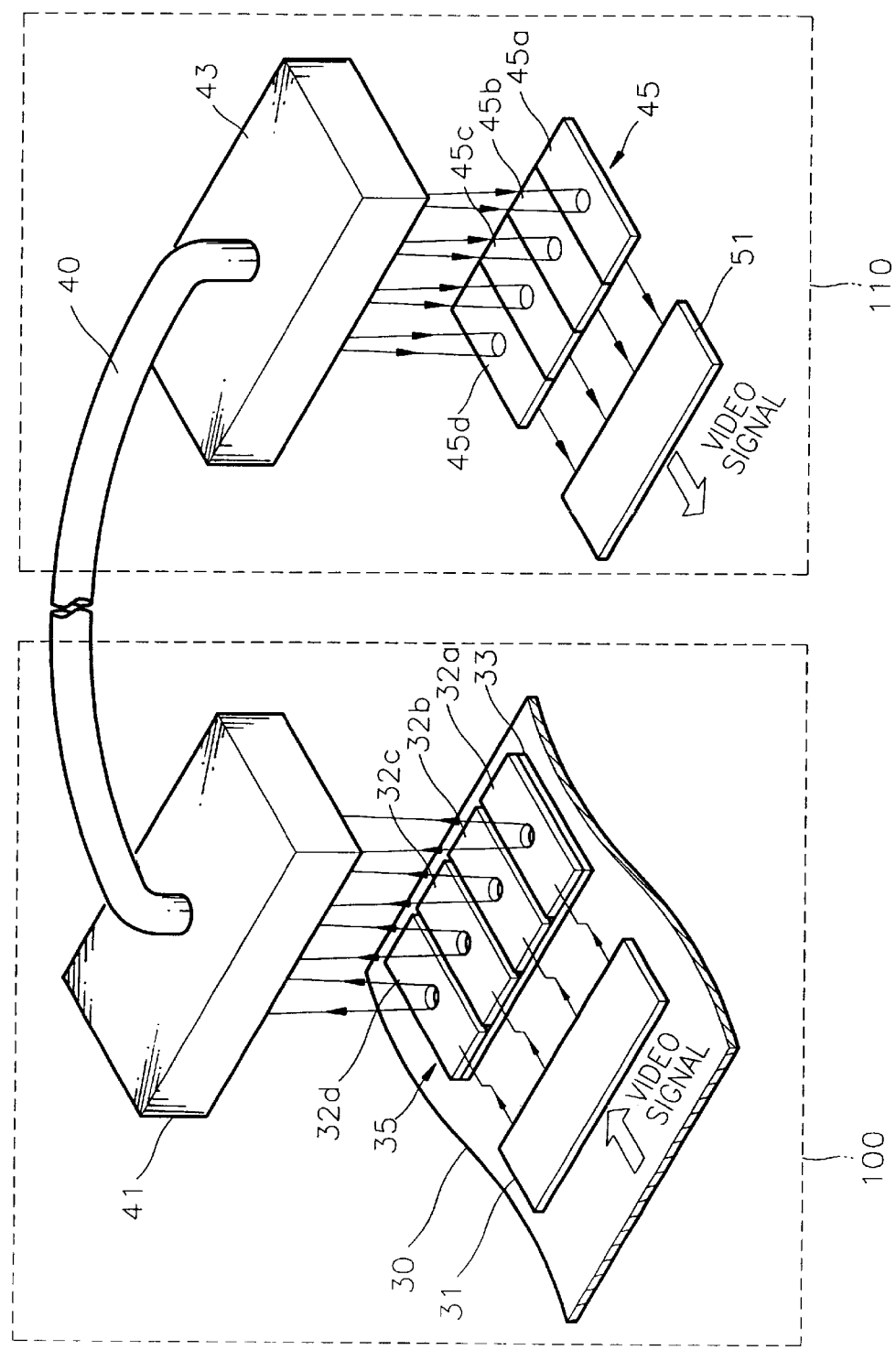
FIG. 4 is a perspective view of a signal transfer apparatus of a computer according to a first embodiment of the present invention.

Referring to FIG. 4, a signal transfer apparatus of a computer according to a first embodiment of the present invention comprises a substrate 30 installed in a main system frame 100 of the computer, a driving device 31 installed on the substrate 30, a semiconductor laser array 35 driven according to a driving signal of the driving device 31, an optical fiber bundle 40 for transferring light emitted from the semiconductor laser array 35 to a photo receiver array 45 of a display 110, and a converter 51 for converting the signal detected by the photo receiver array 45 into a video signal.

A graphics card may be adopted as the substrate 30, and in this case the substrate 30 outputs, e.g., 16-, 32- or 64-bit parallel video signal, that is, a transistor transistor logic (TTL) signal.

The driving device 31 converts each TTL signal independently into a current signal. Here, the driving device 31 outputs an ON current signal when the TTL signal is high, and an OFF current signal when the TTL signal is low.

The semiconductor laser array 35 includes a plurality of semiconductor lasers 32a, 32b, 32c and 32d each emitting light independently, and is driven by the driving device 31 to selectively output laser beams. The semiconductor laser array 35 consists of as many semiconductor lasers as the number of bits of the TTL signal transferred simultaneously. That is, four semiconductor lasers 32a, 32b, 32c and 32d correspond to a 4-bit TTL signal, as shown in FIG. 4.

Here, preferably, the semiconductor lasers 32a, 32b, 32c and 32d are vertical cavity surface emitting lasers (VCSELs). This is because the VCSEL emit beams in a direction parallel to the stacking direction of semiconductor material layers, so that the manufacture of the laser array is easy. Also, the shape of the light emitted from VCSEL is more or less circular and the light emitting angle thereof is small, so that coupling with the optical fiber bundle 40 is easy.

The optical fiber bundle 40 consists of an optical fiber for independently transferring the light emitted from each of the semiconductor lasers 32a, 32b, 32c and 32d. That is, in this embodiment, the optical fiber bundle 40 consists of four optical fibers. Also, the length of the optical fiber bundle 40 approximately corresponds to the distance between the main system frame 100 and the display 110. In addition, if plastic optical fibers are used, a low-cost signal transfer apparatus can be realized.

Ferrules 41 and 43 are connected to both ends of the optical fiber bundle 40. The ferrule 40 connected to one end of the optical fiber bundle 40 is coupled to the semiconductor laser array 35 such that the optical fibers correspond to the semiconductor lasers 32a, 32b, 32c and 32d. The ferrule 43' connected to the other end of the optical fiber bundle 40' is coupled to the photo receiver array 45 of the display 110. The photo receiver array 45 consists of a plurality of photo receivers 45a, 45b, 45c and 45d for converting an incident beam into a current signal. The photo receivers 45a, 45b, 45c and 45d are each connected to an optical fiber of the optical fiber bundle 40. Preferably, the photo receivers 45a, 45b, 45c and 45d are photo diodes or photo transistors. If a heterojunction photo transistor (HPT) is used, an incident optical signal can be amplified after being detected.

The signal detected by the photo receiver array 45 is converted into a TTL signal, i.e., a video signal, in the converter 51. That is, when a high TTL signal is output from the substrate 30 which may be a graphics card, such that the semiconductor lasers 32a, 32b, 32c and 32d emit beams, then the corresponding photo receivers 45a, 45b, 45c and 45d detect an ON current signal, and the detected signal is output as a high TTL signal by the converter 51. Meanwhile, when a low TTL signal is output from the graphics card such that the semiconductor lasers 32a, 32b, 32c and 32d do not emit beams, the corresponding photo receivers 45a, 45b, 45c and 45d detect an OFF current signal and the converter 51 outputs a low TTL signal according to the OFF-current signal. The TTL signals are amplified by an amplifier (not shown) in the converter 51. Thus, the display 110 displays an image according to the TTL signal output from the converter 51.

Figure 5:
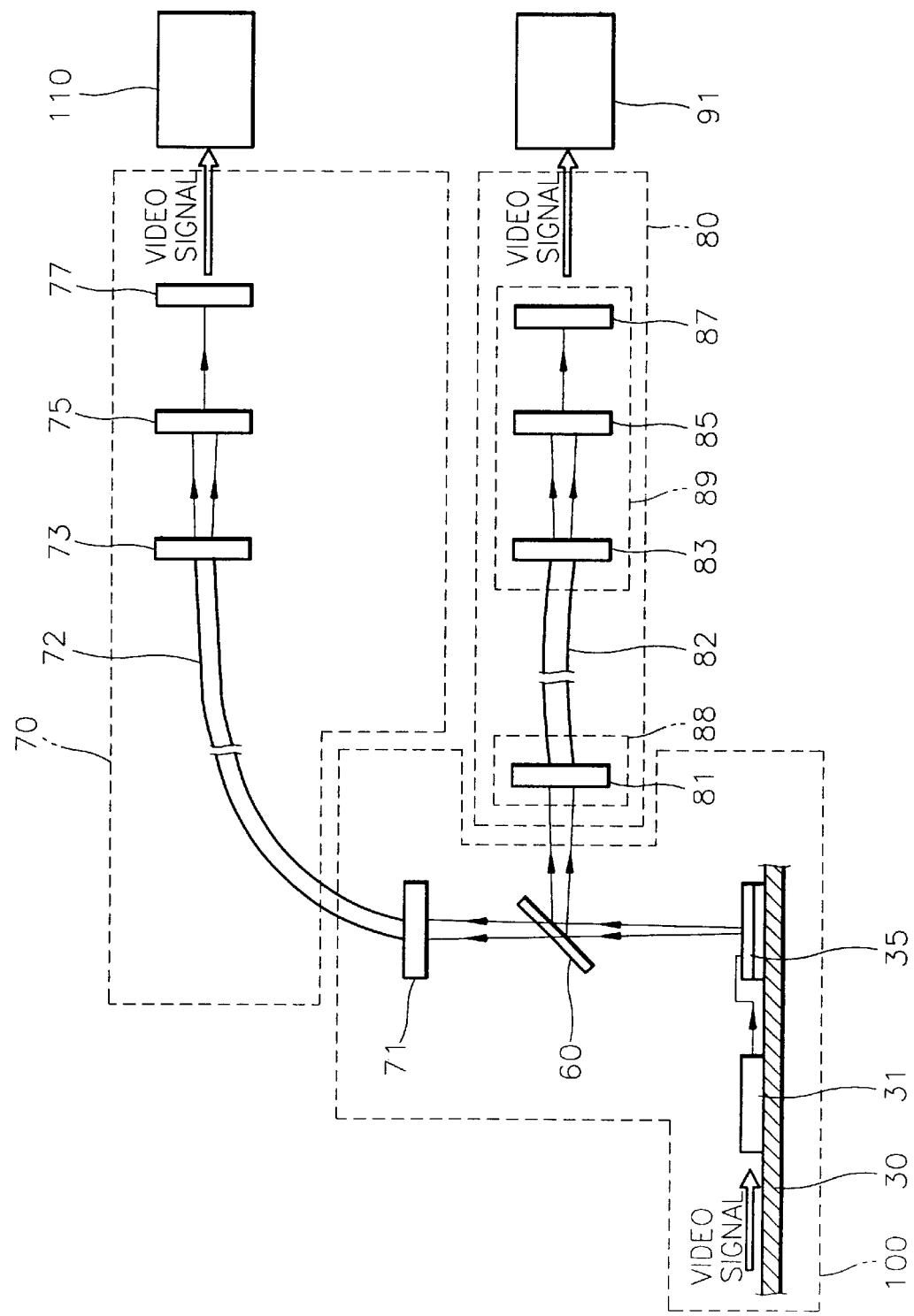
FIG. 5 is a diagram showing the structure of a signal transfer apparatus of a computer according to a second embodiment of the present invention.

FIG. 5 is a diagram showing the structure of a signal transfer apparatus of a computer according to a second embodiment of the present invention. Here, the same reference numerals as in FIG. 4 represent the same elements.

The signal transfer apparatus comprises a beam splitter 60 for splitting the light emitted from the semiconductor laser array 35, a first transfer portion 70 for transferring one optical signal diverged by the beam splitter 60, and a second transfer portion 80 for transferring the other optical signal diverged by the beam splitter 60 to an external display 91.

Figure 6:
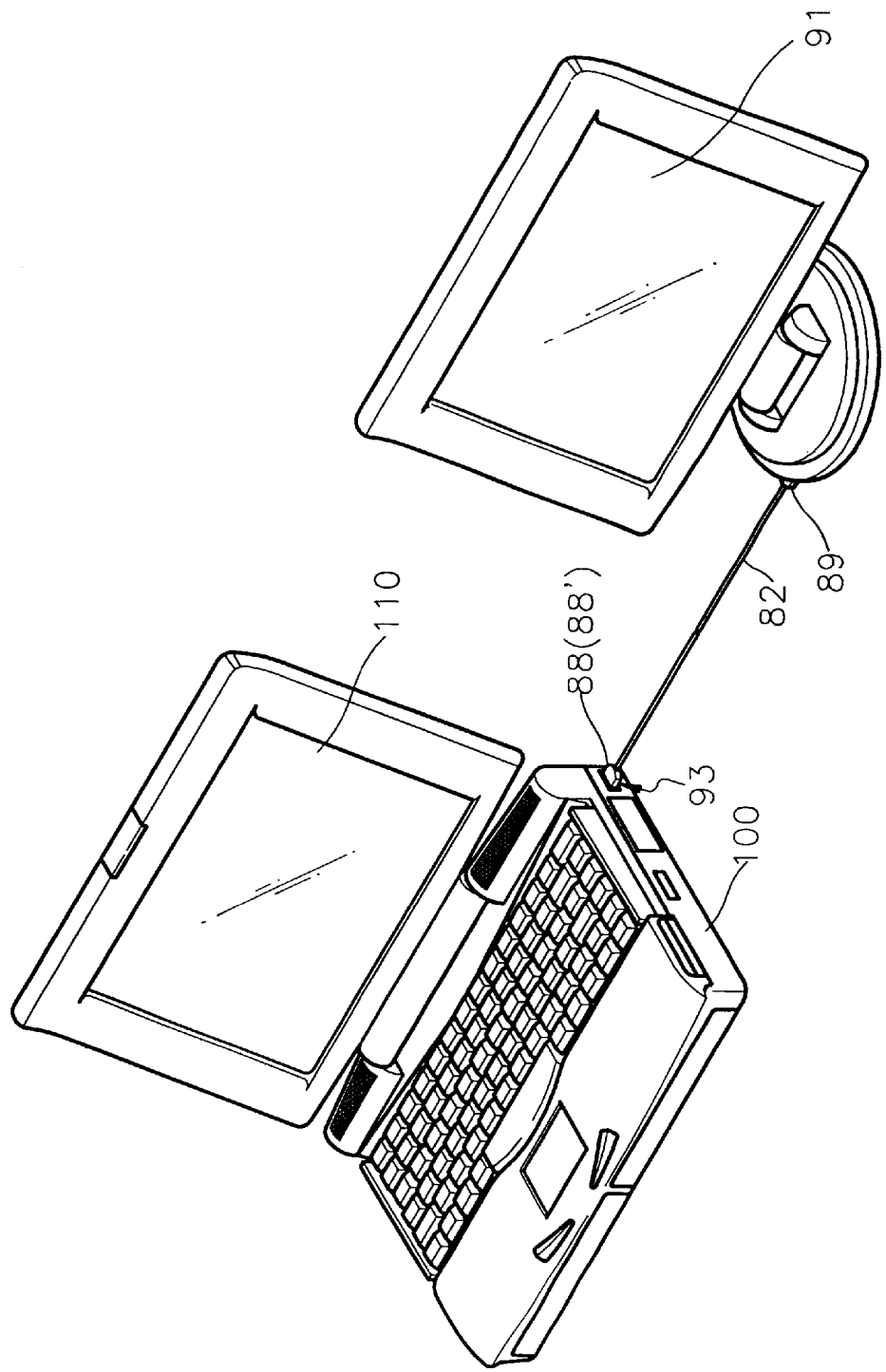
FIG. 6 is a perspective view of a laptop computer adopting the signal transfer apparatus of FIG. 5.

The external display 91 is selectively connected to the main system frame 100 of the computer via a connection cable as shown in FIG. 6 if required.

The beam splitter 60 partially transmits and reflects the light emitted from the semiconductor laser array 35 according to a driving signal of the driving device 31, to split the incident light, preferably, in a ratio of 50:50.

The first transfer portion 70 comprises a first optical fiber bundle 72 for transferring a part of the light split by the beam splitter 60 to the display 110, a first photo receiver array 75 provided at the output end of the first optical fiber bundle 72, for independently converting the incident light into a current signal, and a first converter 77 for converting the current signal output by the first photo receiver array 75 into a video signal driving the display 110. Also, ferrules 71 and 73 to be coupled with the semiconductor laser array 35 and the first photo receiver array 75, respectively are connected to both ends of the first optical fiber bundle 72.

The second transfer portion 80 comprises a second optical fiber bundle 82 for transferring the other part of the light split by the beam splitter 60 to the external display 91, a second photo receiver array 85 provided at the output end of the second optical fiber bundle 82, for independently converting the incident light into a current signal, and a second converter 87 for converting the current signal output by the second photo receiver array 85 into a video signal driving the external display 91. Also, ferrules 81 and 83 to be coupled with the semiconductor laser array 35 and the second photo receiver array 85, respectively are connected to both ends of the second optical fiber bundle 82.

Here, the ferrule 81 is coupled to a connector 88 to be connected to a connection jack 93 of the main system frame 100 as shown in FIG. 6. Also, it is preferable that the ferrule 83, the second photo receiver array 85 and the second converter 87 are installed within an adaptor 89 detachable from the external display 91.

The configurations of the semiconductor laser array 35, the first and second optical fiber bundles 72 and 82, the first and second photo receiver arrays 75 and 85, and the first and second converters 77 and 87 are the same as those in the first embodiment.

In this embodiment, since signals are transferred through the optical fiber bundles as a light signal of good quality, the signals can be transferred to the external display 91 far away from the main system frame 100, e.g., by 50 m or more, as well as to the display 110.

Figure 7:
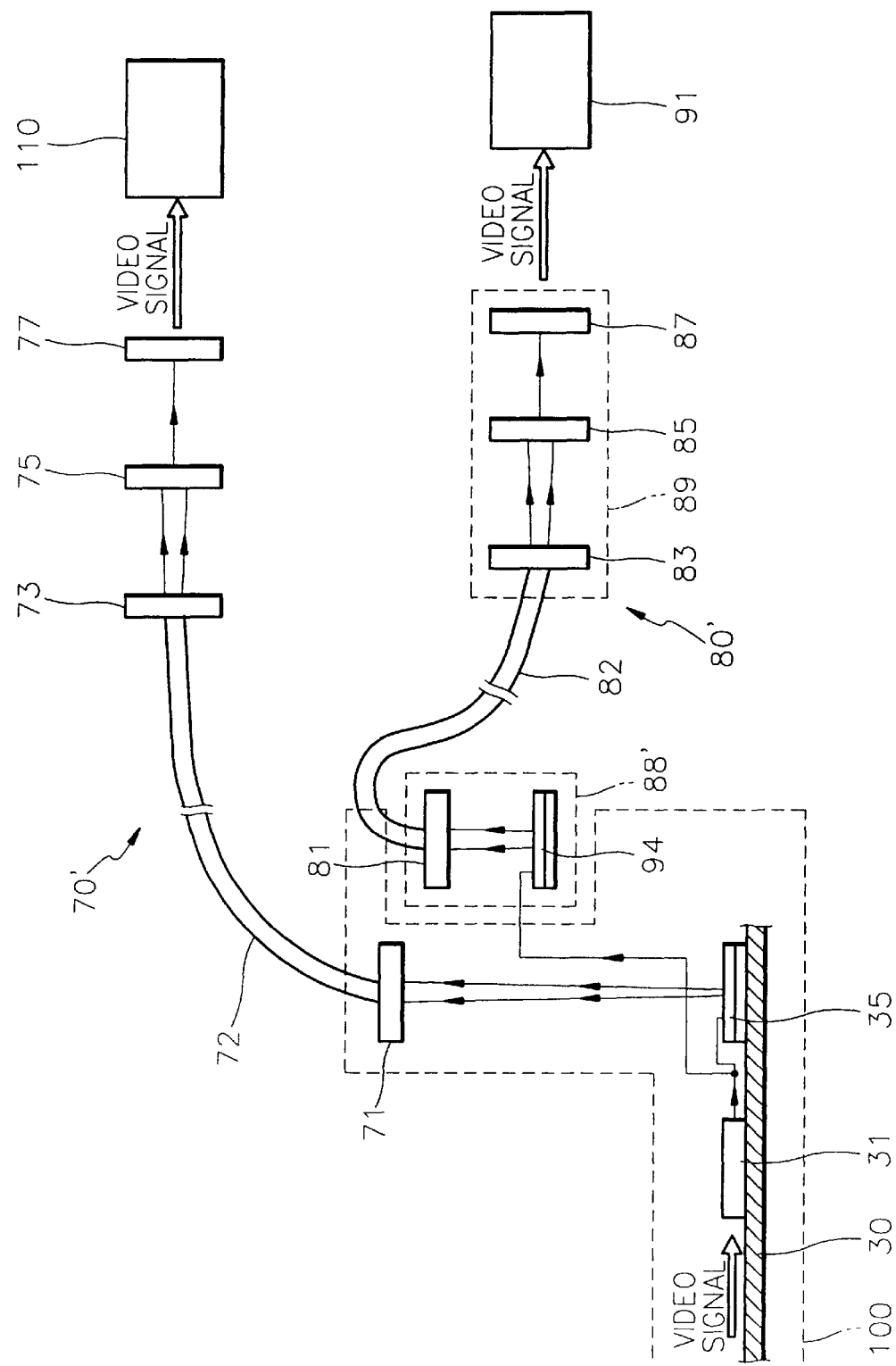
FIG. 7 is a diagram showing the structure of a signal transfer apparatus of a computer according to a third embodiment of the present invention.

FIG. 7 is a diagram showing the structure of a signal transfer apparatus of a computer according to a third embodiment of the present invention. Here, the same reference numerals as in FIGS. 5 and 6 represent the same elements as those in the first and second embodiments.

The signal transfer apparatus of FIG. 7 comprises a first transfer portion 70' for transferring a signal to a display 110 and a second transfer portion 80' for transferring a signal to an external display 91.

According to the characteristics of the third embodiment, and second semiconductor laser array are used semiconductor. A first laser array 35 for emitting light to be transferred through the first transfer portion 70' is installed in the substrate 30 of the main system frame 100. A second semiconductor laser array 94 for emitting light to be transferred through the second transfer portion 80' is installed in a connector 88'. Here, the connector 88' is coupled to a connection jack 93 of the main system frame 100 of the computer as shown in FIG. 6, to be electrically connected with the driving device 31.

Also, the first and second semiconductor laser arrays 35 and 94 selectively emit light in response to the driving of the driving device 31, and the configurations thereof are the same as in the above embodiments.

A video signal is converted into an optical signal in the first semiconductor laser array 35 by the driving of the driving device 31 of the main system frame 100, and then transferred through the first transfer portion 70'. Then the transferred optical signal is converted back into a video signal in the first converter 77, to thereby drive the display 110.

In a similar manner, a video signal is converted into an optical signal in the second semiconductor laser array 94 by the driving of the driving device 31, and then transferred through the second transfer portion 80'. Then the transferred optical signal is converted back into a video signal, to thereby drive the external display 91.

Alternatively, the second semiconductor laser array 94 may be installed in the substrate 30 of the main system frame 100.

In the signal transfer apparatus of a computer according to the present invention, a video signal is converted into an optical signal to be transferred through an optical fiber bundle, so that high-speed data transfer is possible without the problem of electromagnetic interference. Also, a signal can be transferred to an external display far away from the main system frame of the computer.

What is claimed is:

1. A signal transfer apparatus of a computer, comprising:
   a substrate installed in a main system frame of the computer;
   a driving device installed on the substrate, for converting a video signal into a current signal;
   a semiconductor laser array for emitting light corresponding to the current signal from the driving device;
   an optical fiber bundle for transferring the light emitted from the semiconductor laser array to a display;
   a photo receiver array installed in the display for converting the light transferred through the optical fiber bundle into a current signal; and
   a converter installed in the display for converting the current signal output from the photo receiver array into a video signal.

2. The signal transfer apparatus of claim 1, wherein the semiconductor laser array consists of as many semiconductor lasers as the number of bits of the video signal to be transferred.

3. The signal transfer apparatus of claim 2, wherein the photo receiver array consists of photo diodes corresponding to the semiconductor lasers.

4. The signal transfer apparatus of claim 2, wherein the semiconductor laser array includes vertical cavity surface emitting lasers for emitting light in a direction parallel to the stacking direction of semiconductor material layers.

5. The signal transfer apparatus of claim 1, wherein the optical fiber bundle consists of plastic optical fibers.

6. The signal transfer apparatus of claim 1, wherein a length of the optical fiber bundle approximately corresponds to the distance between the main system frame and the display.

7. A signal transfer apparatus of a computer, comprising:
   a substrate installed in a main system frame of the computer;
   a driving device installed on the substrate, for converting a video signal into a current signal;
   a semiconductor laser array for emitting light corresponding to the current signal from the driving device;
   a beam splitter for splitting the light emitted from the semiconductor laser array;
   a first transfer portion including a first optical fiber bundle for transferring a part of the light split by the beam splitter to a first display, a first photo receiver array for converting the light transferred through the first optical fiber bundle into a current signal, and a first converter for converting the current signal output from the first photo receiver array into a video signal; and
   a second transfer portion including a second optical fiber bundle for transferring a second part of the light split by the beam splitter to a second display, a second photo receiver array for converting the light transferred through the second optical fiber bundle into a current signal, and a second converter for converting the current signal output from the second photo receiver array into a video signal,
   wherein said first display is integrated with said computer and said second display is external to said computer.

8. The signal transfer apparatus of claim 7, wherein the semiconductor laser array consists of as many semiconductor lasers as the number of bits of the video signal to be transferred.

9. The signal transfer apparatus of claim 7, wherein the semiconductor laser array includes vertical cavity surface emitting lasers for emitting light in a direction parallel to the stacking direction of semiconductor material layers.

10. The signal transfer apparatus of claim 7, wherein the second transfer further comprises a connector connected to a connection jack provided in the main system frame of the computer and having a ferrule coupled with one end of the second optical fiber bundle.

11. A signal transfer apparatus of a computer, comprising:
a substrate installed in a main system frame of the computer;
a driving device installed on the substrate, for converting a video signal into a current signal;
first and second semiconductor laser arrays for each emitting light corresponding to the current signal of the driving device;
a first transfer portion including a first optical fiber bundle for transferring the light emitted from the first semiconductor laser array to a first display, a first photo receiver array for converting the light transferred through the first optical fiber bundle into a current signal, and a first converter for converting the current signal output from the first photo receiver array into a video signal; and
a second transfer portion including a second optical fiber bundle for transferring the light emitted from the second semiconductor laser array to a second display, a second photo receiver array for converting the light transferred through the second optical fiber bundle into a current signal, and a second converter for converting the current signal output from the second photo receiver array into a video signal,
wherein said first display is integrated with said computer and said second display is external to said computer.

12. The signal transfer apparatus of claim 11, wherein each of the first and second semiconductor laser arrays consists of as many semiconductor lasers as the number of bits of the video signal to be transferred.

13. The signal transfer apparatus of claim 12, wherein each of the first and second semiconductor laser arrays include vertical cavity surface emitting lasers for emitting light in a direction parallel to the stacking direction of semiconductor material layers.

14. The signal transfer apparatus of claim 11, wherein the second transfer portion further comprises a connector connected to a connection jack provided in the main system frame of the computer and having a ferrule coupled with one end of the second optical fiber bundle, wherein the second semiconductor laser array is installed in the connector.

15. The signal transfer apparatus of claim 11, wherein the first photo receiver array is formed by a plurality of photo diodes.

16. The signal transfer apparatus of claim 15, wherein the second photo receiver array is formed by a plurality of photo diodes.

17. The signal transfer apparatus of claim 11, wherein the second photo receiver array is formed by a plurality of photo diodes.

* * * * *